(12) United States Patent
Ricketts et al.

(10) Patent No.: US 8,690,513 B2
(45) Date of Patent: Apr. 8, 2014

(54) UNLOADER SYSTEM WITH CAM OPERATED RAISE SYSTEM

(75) Inventors: Jonathan E. Ricketts, Ephrata, PA (US); Joshua D. Werning, Mt. Wolf, PA (US)

(73) Assignee: CNH America LLC, New Holland, PA (US)

( * ) Notice: Subject to any disclaimer, the term of this patent is extended or adjusted under 35 U.S.C. 154(b) by 711 days.

(21) Appl. No.: 12/614,772

(22) Filed: Nov. 9, 2009

(65) Prior Publication Data

US 2010/0290879 A1 Nov. 18, 2010

Related U.S. Application Data

(60) Provisional application No. 61/216,521, filed on May 18, 2009.

(51) Int. Cl.
*B60P 1/42* (2006.01)

(52) U.S. Cl.
USPC .................................. 414/523; 198/861.2

(58) Field of Classification Search
USPC ........................................ 414/523; 198/861.2
See application file for complete search history.

(56) References Cited

U.S. PATENT DOCUMENTS

| | | | |
|---|---|---|---|
| 1,436,428 A | 11/1922 | Kutscha | |
| 2,761,578 A | 9/1956 | Brownlee et al. | |
| 3,021,025 A * | 2/1962 | Sudenga et al. | 414/505 |
| 3,241,657 A | 3/1966 | Buschbom | |
| 3,521,767 A * | 7/1970 | Rossi | 414/523 |
| 3,642,155 A * | 2/1972 | Carlson | 414/523 |
| 3,721,333 A | 3/1973 | Boone | |
| 4,662,812 A | 5/1987 | Busboom et al. | |
| 4,846,621 A | 7/1989 | Warsaw | |
| 5,103,623 A | 4/1992 | Herrett | |
| 5,356,360 A * | 10/1994 | Johns | 482/99 |
| 5,433,520 A * | 7/1995 | Adams et al. | 366/8 |
| 5,520,495 A * | 5/1996 | Sukup | 414/523 |
| 5,538,388 A | 7/1996 | Bergkamp et al. | |
| 5,865,675 A | 2/1999 | Meester | |
| 5,876,176 A * | 3/1999 | Smith et al. | 414/523 |
| 5,888,044 A * | 3/1999 | Baskerville | 414/523 |
| 5,980,189 A | 11/1999 | Rubner | |
| 6,112,336 A * | 9/2000 | Markle et al. | 4/246.1 |
| 6,609,603 B2 * | 8/2003 | Cole | 193/10 |
| 6,767,174 B2 | 7/2004 | Cresswell | |
| 7,168,554 B2 | 1/2007 | Brandt | |
| 7,494,409 B2 | 2/2009 | Voss et al. | |

\* cited by examiner

*Primary Examiner* — Scott Lowe
(74) *Attorney, Agent, or Firm* — Patrick M. Sheldrake; Seyed V. Sharifi (57) ABSTRACT

The unloader system has a conveyor and a raise system having an elongate support element including a flexible first end portion and an opposite second end, the first end portion being connected to a support structure at a location higher than a first end of the conveyor, and the second end being connected to the conveyor at a location therealong adjacent to a free end thereof. A cam element is disposed on the support structure in a path of movement of the flexible first end portion of the support element such that as the conveyor is pivoted from the stored position toward the operating position the flexible first end portion will conformingly engage or bend about the cam element to raise the free end of the conveyor. The conveyor can include an elbow which is straightened by this action for raising the free end.

11 Claims, 6 Drawing Sheets

UNLOADER SYSTEM WITH CAM OPERATED RAISE SYSTEM

This application claims the benefit of U.S. Provisional Application No. 61/216,521, filed May 18, 2009.

TECHNICAL FIELD

This invention relates generally to an unloader system for bulk materials such as agricultural crop material and the like, and more particularly, to an unloader system having a raise system for an unloader conveyor that automatically supports and raises a free end of the conveyor while optionally straightening it from a bent or folded condition, as the conveyor is pivoted from a stored position to an operating position.

BACKGROUND OF THE INVENTION

U.S. Provisional Application No. 61/216,521, filed May 18, 2009, is incorporated herein in its entirety by reference.

A variety of bulk materials are conveyed by elongate conveyors carried on vehicles such as harvesters, carts, wagons, and the like, herein collectively referred to generally by the term cart. As a non-limiting example, are agricultural crop materials, such as silage, crop residue such as cobs from corn, and the like, and animal waste or manure. Of particular interest presently are corn cobs and other crop residue, for which demand has recently increased, due to use in making ethanol. The generation of corn cobs in volume occurs during the corn harvesting process, which is typically done using a combine, generally by threshing and cleaning the kernels of corn from the cobs, husks and other residue or stover.

The corn kernels are typically collected, at least initially, in a clean grain tank of the combine, which is periodically unloaded, often on the go, during the harvesting operation. If the cobs (and/or other residue) is/are collected, a separate container is typically used, and is often a cart or wagon towed by the combine. Due to limitations on the towing capacity of combines, the size or capacity of such carts or wagons is limited, and thus the cart or wagon must also be unloaded from time to time, often at different times or frequency than the unloading of the corn, which can have a negative effect on productivity and efficiency. As a result, it would be valued to have the capability to unload the cobs on the go while harvesting. This would typically entail having a receiving container, such as a larger cart, a truck or the like, moving at the same speed beside the cart to be unloaded, in sidewardly spaced relation thereto.

A receiving container will typically be a relatively tall structure, thus necessitating an ability to unload into such structure from an equal or greater height. Typically, it is desirable to unload carts or wagons from the bottom, such that the material being unloaded must be conveyed upwardly from the lower region of the cart, to a sufficient height for unloading into the receiving container, which necessitates use of a conveyor having a relatively long length. It is also commonly desired for an unloader conveyor to be carried on board a cart or wagon, but if the conveyor extends upwardly beyond the top of the cart, it can contact various obstacles, such as trees, low hanging wires, and the like.

As another potential problem wherein it is contemplated that an unload conveyor will be operated using pressurized fluid, there can be a lack of pressurized fluid capacity of the supplying machine or system for handling the additional fluid load of the conveyor, particularly when the conveyor includes high fluid demand devices such as fluid cylinders and the like.

Thus, what is sought is an unloader system for a bulk materials cart, wagon or other vehicle or container, having a conveyor with a sufficient length for unloading material upwardly into a relatively high receiver, and which can be stowed on board the cart without projecting significantly thereabove, and which overcomes one or more of the problems set forth above.

SUMMARY OF THE INVENTION

What is disclosed is an unloader system with a cam operated raise system for a bulk materials cart, wagon or other vehicle or container, having a conveyor with a sufficient length and height for unloading material upwardly into a relatively high receiver, and which can be stowed on board the cart without projecting significantly thereabove, and which overcomes one or more of the problems set forth above.

According to a preferred aspect of the invention, the unloader system includes a support structure disposed on the cart, wagon or other vehicle or container. An elongate conveyor has a first end supported on the support structure for pivotal movement about an upwardly extending pivotal axis between a stored position and an operating position angularly related to the stored position. The conveyor extends longitudinally from the first end to a free end spaced from the support structure. The unloader system includes a raise system having an elongate support element including a flexible first end portion and an opposite second end. The first end portion is connected to the support structure at a location higher than the first end of the conveyor, and the second end is connected to the conveyor at a location therealong closer to the free end than to the first end. The raise system includes a cam element disposed on the support structure in a path of movement of the flexible first end portion of the support element such that as the conveyor is pivoted from the stored position toward the operating position the flexible first end portion will conformingly engage the cam element to raise the free end of the conveyor.

According to another preferred aspect of the invention, the support element comprises a cable, and the cam element includes a curved surface about which the cable will bend as the conveyor is pivoted toward the operating position.

According to another preferred aspect of the invention, the conveyor includes an elbow at a location intermediate the first end and the free end, the support element being configured to cause the elbow to straighten from a height lowering downwardly bent or folded configuration to raise the free end of the conveyor when pivoted to the operating position, and to cause the elbow to bend or fold downwardly to lower the free end of the conveyor when pivoted to the stored position.

The invention can include a variety of alternative conveyors, including, but not limited to, a belt conveyor, a helical auger conveyor, and the like.

As an advantage of the invention, the conveyor can be configured in the stored position lowered and bent or folded downwardly alongside the support structure of the vehicle or container, so as to be more compact and less likely to contact and damage, or be damaged by, objects above the cart such as trees, utility wires, and the like. As another advantage, when in the operating position, the free end of the conveyor is raised by the raise system to a sufficient height for unloading into relatively tall receivers such as wagons, trailers and the like. As still another advantage, because of the use of the cam element for raising and lowering the conveyor, and also for unbending and bending the conveyor at the elbow, no pressurized fluid is required for these functions, and thus no load is placed on a fluid system of an accompanying vehicle such as a harvesting machine or the like for performing these functions. Also, as an advantage, as these functions occur as a result of only the movement of the conveyor between the stored and operating positions, no additional control circuit is required, and the unloading operation can be performed using only circuits for controlling an actuator or driver for pivoting the conveyor between the two positions, and for operating the conveyor.

DETAILED DESCRIPTION OF THE INVENTION

Figure 2:
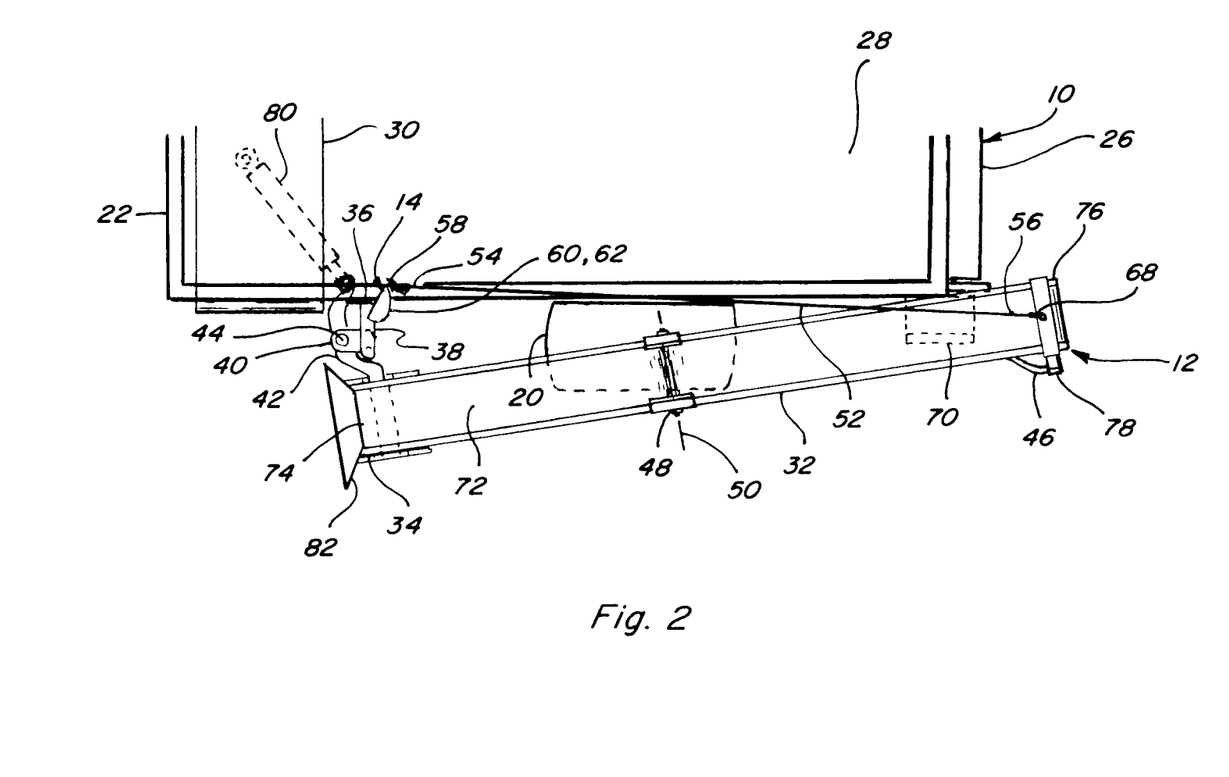
FIG. 2 is a fragmentary top view of the cart and the conveyor in the stored position.
Figure 3:
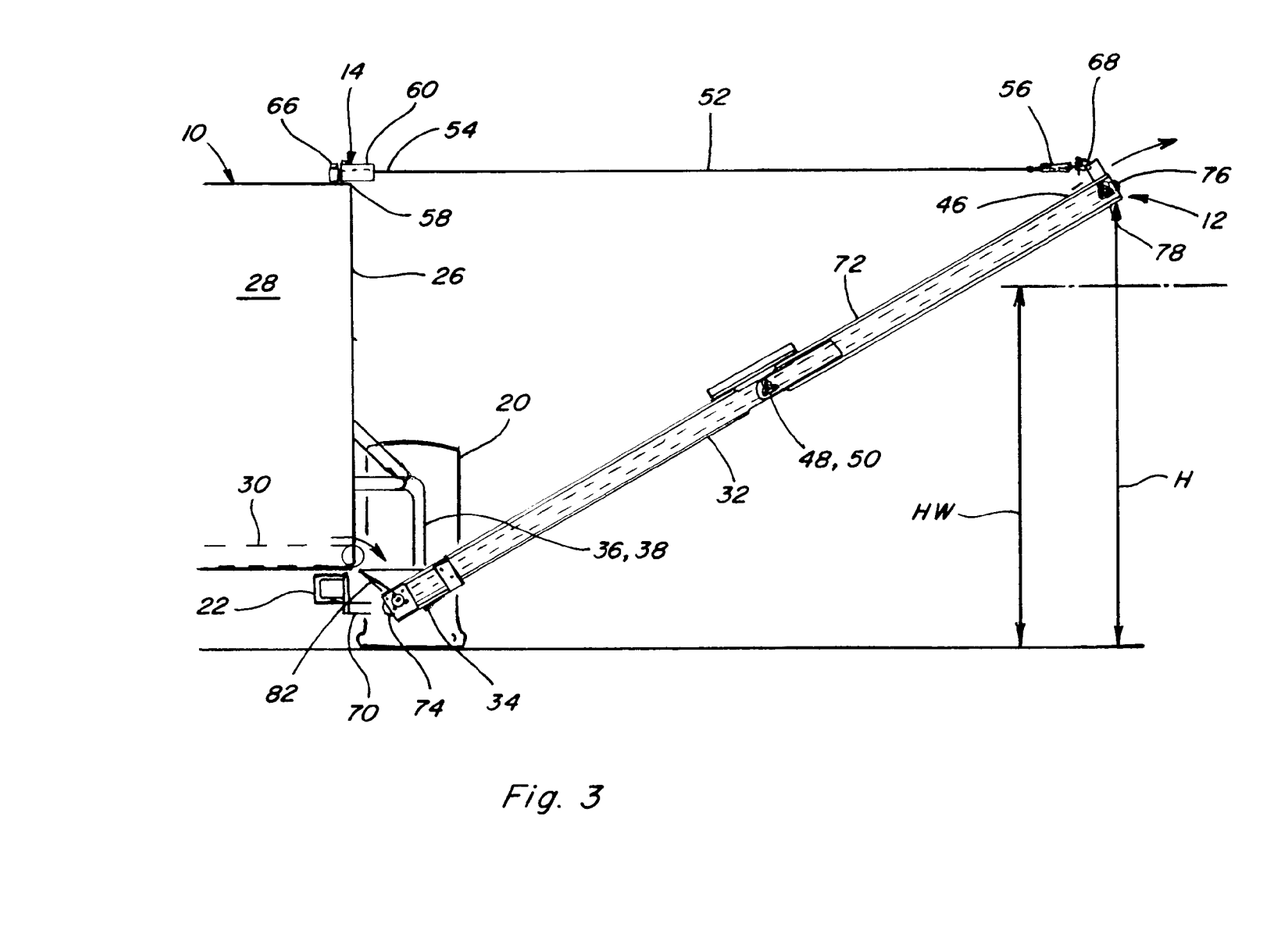
FIG. 3 is a fragmentary front view of the cart, showing the conveyor in a raised operational position extending outwardly from the cart.
Figure 4:
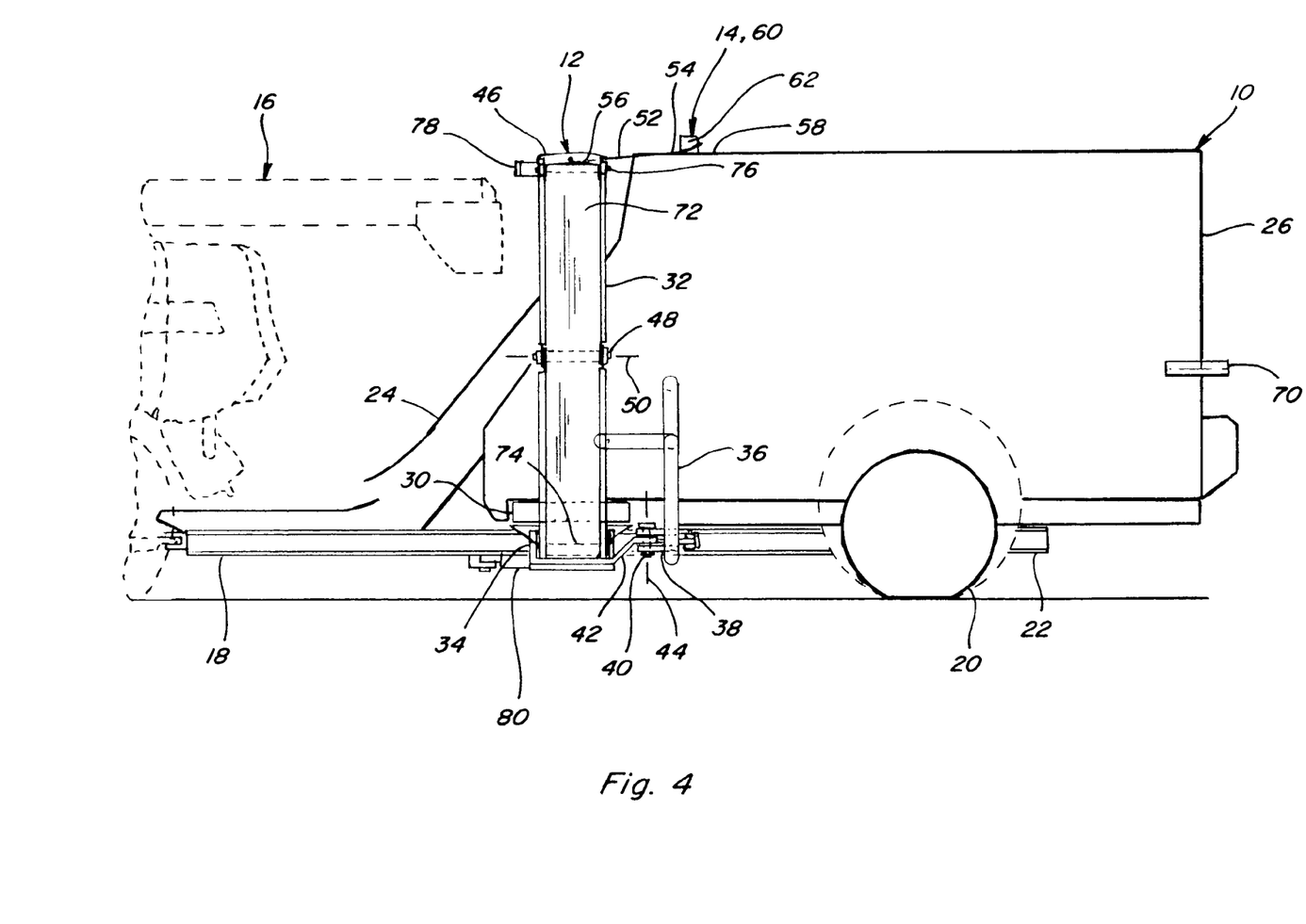
FIG. 4 is a side view of the cart with the conveyor in the raised operational position.

Referring now to the drawings, in FIGS. 1, 2, 3, 4, 5, and 6, a bulk materials cart 10 including an unloader system 12 having a cam operated raise system 14 constructed and operable according to the teachings of the present invention, is shown. Cart 10 as illustrated is configured for holding and unloading a wide variety of bulk materials, including, but not limited to, agricultural products such as corn cobs generated during corn harvesting operations in the well-known manner. Here, cart 10 is illustrated in FIG. 4 connected in towed relation to an agricultural harvesting machine 16 which is a combine operable in the well-known manner for harvesting ears of corn from corn plants, separating the kernels of corn from the cobs and other crop residue or stover, and discharging the cobs from the combine. Cart 10 can be connected to machine 10 in any suitable manner, such as, but not limited to, by a forwardly extending tongue 18 including structure such as a clevis, ball receiver, or other connector (not shown) for connection to a suitable device on a towing vehicle such as machine 16. Here also, for mobility, cart 10 is illustrated including a pair of wheels 20, supporting a frame 22, but it should be understood that cart 10 can alternatively be configured to include an additional number of wheels, tracks, or other apparatus affording suitable mobility, as desired or required for a particular application.

Cart 10 here includes a conveyor system 24 operable for receiving the cobs discharged from machine 10, and conveying them upwardly and into a wall structure 26, both supported on frame 18. Wall structure 26 defines and bounds an internal chamber 28 into which the cobs are conveyed by system 24. Unloader system 12 includes at least one conveyor for conveying the cobs from chamber 28, e.g. a conveyor floor or augers (not shown) to a cross conveyor 30 disposed below conveyor system 24, and operable for conveying the cobs sidewardly to the lower edge of cart 10, in the well known manner.

As noted above, when collecting cobs while harvesting, often the cob container (here cart 10) will require unloading at times different than those when unloading the corn is required. Additionally, sometimes it is desired to unload on the go into an accompanying container, such as a grain truck or wagon traveling alongside the cart and at other times, or onto a stationary location such as the ground at the edge of a field, or the like. In the first instance, the ability to convey the cobs to a sufficient height for flow over the side of a truck or wagon is a concern, which is also a concern with other high walled bulk material receivers. The cobs will be fed to the unloader conveyor from cross conveyor 30 at the bottom of the cart, which necessitates that the unloader conveyor be relatively long when operational. However, it is also desired that the conveyor not extend upwardly substantially beyond the height of the cart when stored, to avoid contact with obstacles and the like.

Figure 1:
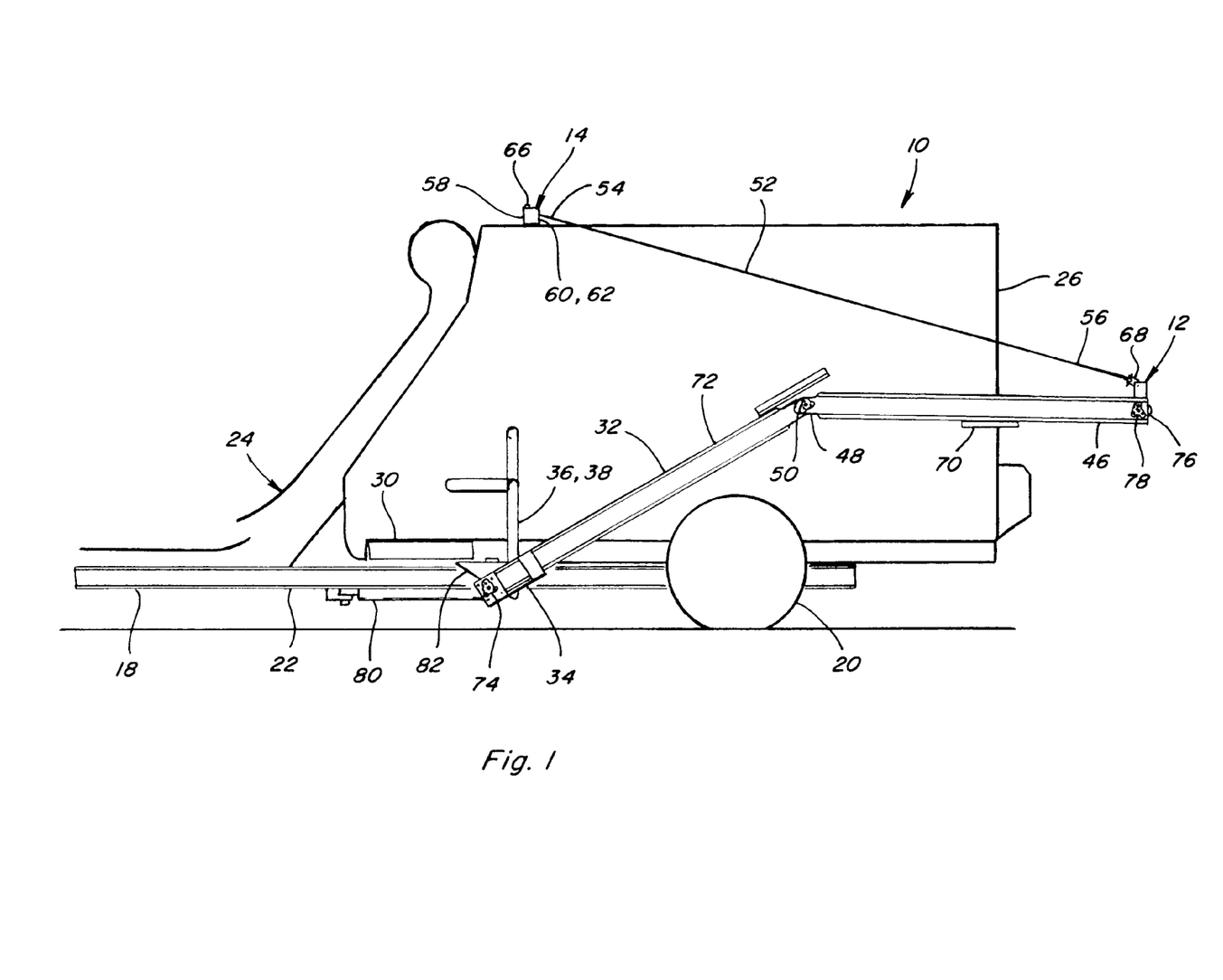
FIG. 1 is a side view of a bulk materials cart including an unloader system with a cam operated raise system constructed and operable according to the teachings of the present invention, a conveyor of the unloader shown in a lowered stored position extending along a side of the cart.
Figure 5:
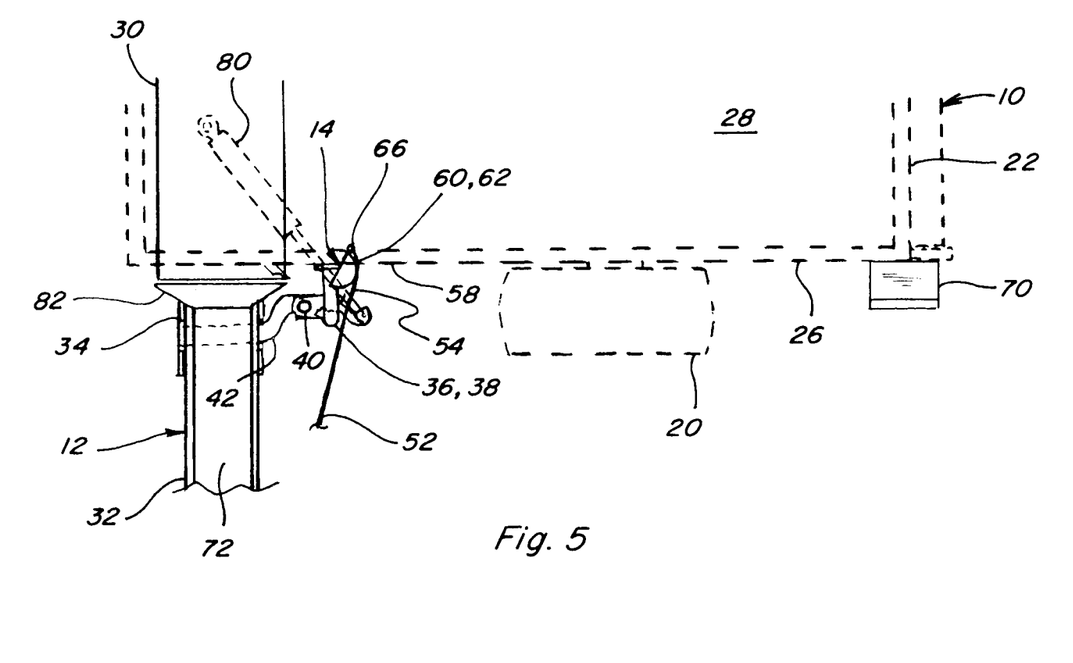
FIG. 5 is a fragmentary top view of the cart with the conveyor in the raised operating position.

To provide the required unloading capability, particularly sufficient length when operational, and compactness when stored on cart 10, unloader system 12 includes an elongate conveyor 32 having a lower first end 34 mounted to cart 10 by a support structure 36, for generally horizontal pivotal movement between a stored position, as shown in FIGS. 1 and 2, and an operational position angularly related to the stored position, as shown in FIGS. 3, 4 and 5.

Support structure 36 can comprise any structural part of cart 10 sufficient for supporting the components of unloader system including when operational for unloading cobs, here structure 36 including a bracket 38 mounted to the side of frame 22 adjacent to an end of cross conveyor 30. Bracket 38 includes a pivot pin 40, which connects a bracket 42 on first end 34 of conveyor 32, to bracket 38, for pivotal movement of bracket 42 and conveyor 32 about a generally vertical or upwardly extending pivotal axis 44.

Conveyor 32 is preferably a belt type conveyor having a second or free end 46 opposite first end 34, and is mounted to bracket 42 so as to extend upwardly at a small acute angle of incline from first end 34 to free end 46. Conveyor 32 preferably also includes an elbow 48 at about a middle intermediate location between ends 34 and 46. Elbow 48 comprises a horizontal pivotal axis 50 which connects free end 46 to first end 34, for free upward and downward pivotal movement relative thereto, between a bent or folded stored position (FIGS. 1 and 2) and an unbent or unfolded operational position (FIGS. 3 and 4).

Cam operated raise system 14 of unloader system 12 includes an elongate support element 52 including a flexible first end portion 54 and an opposite second end 56. First end portion 54 is connected to an element 58 of support structure 36 at a location higher than first end 34 of conveyor 32, which here comprises an upper region of wall structure 26. Second end 56 is connected to free end 46 of conveyor 32 outwardly of elbow 48, the connections of ends 54 and 56 being configured and such that as conveyor 32 is pivoted between the stored and operating positions, first end portion 54 will move in a generally horizontal sweeping movement along a predetermined path, denoted by letter P. Raise system 14 includes a cam element 60 disposed on support structure 36 in path of movement P of the flexible first end portion 54, such that as conveyor 32 is pivoted from the stored position toward the operating position, first end portion 54 will conformingly engage or partially bend about cam element 60, to automatically raise free end 46 of conveyor 32. And, when conveyor 32 is pivoted in the reverse direction to the stored position, first end portion will disengage and unbend, to lower free end 46.

Figures 6, 7:
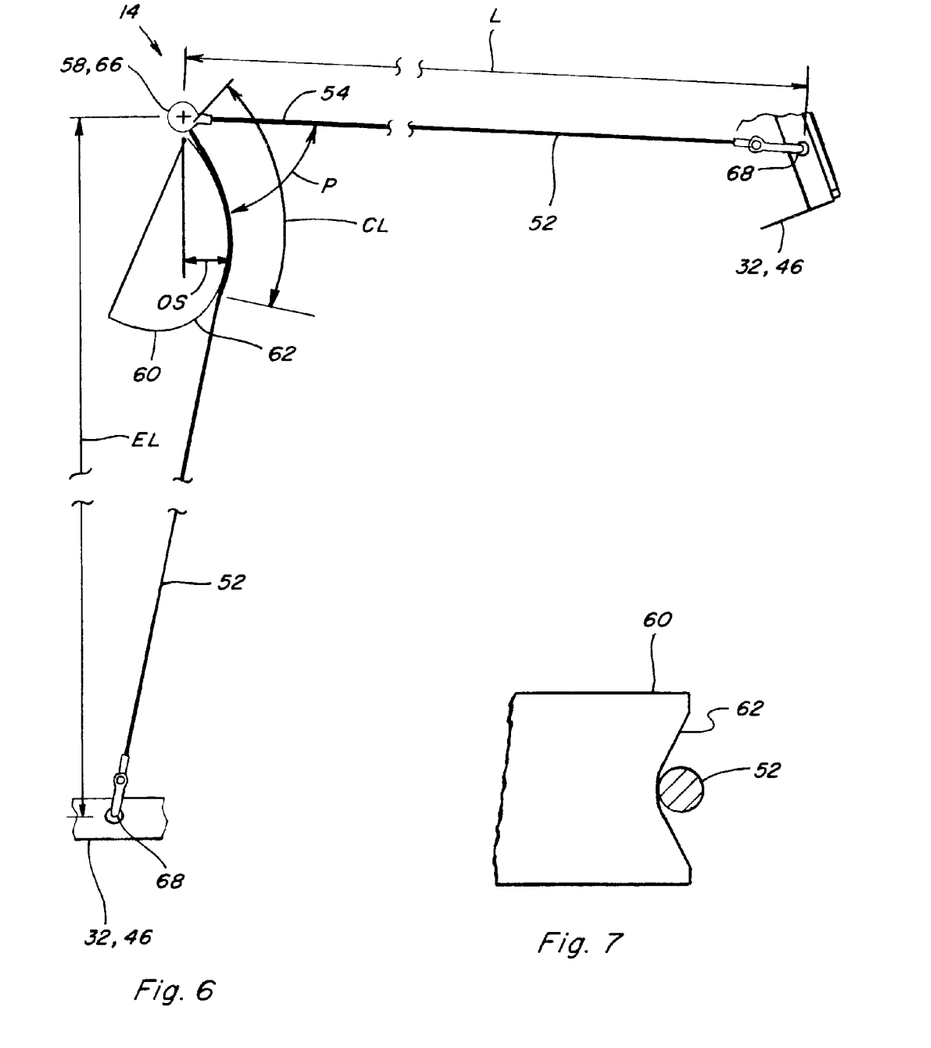
FIG. 6 is a schematic top view of aspects of the raise system in a first configuration representative of when the conveyor is in the stored position, and in a second configuration representative of when the conveyor is in the operating position.
FIG. 7 is a fragmentary end view of a cam element of the raise system, showing a support element received in a grooved cam surface thereof.

Referring particularly to FIG. 6, it can be observed that support element 52, when not bent or deformed in conforming engagement with cam surface 62 of cam element 60, will have a length L as measured along a straight line between pivot joints 66 and 68 connecting free end 46 of conveyor 32 to support 58, which is representative of when conveyor 32 is in the stored position. As conveyor 32 is pivoted toward the operating position, first end portion 54 will follow a predetermined path of movement P, so as to contact and conformingly bend about surface 62 which is positioned along path P as shown, such that support element 52 will have an effective length EL, along a straight line between joints 66 and 68, which will be shorter. This effective shortening of the length of support element 52 will cause support element 52 to raise free end 46 of conveyor 32 about elbow 48 to the desired height. Here, cam element 60 includes a curved cam surface 62 having a circumferential length CL, offset a distance OS from the straight line between joints 66 and 68, selected to achieve the illustrated degree of raising of free end 46. However, it should be noted that surface 62 can have a variety of different shapes, including a linear shape or an angular shape, and a variety of lengths, for achieving an effective length EL required for raising free end 56 as desired or required for a particular application. Here also, it should be noted that the entire length of support element 52 can comprise a cable of a suitable flexible material such as metal wire or aramid fiber cloth or belting, although it should be noted that, alternatively, element 52 could be constructed such that only first end portion 54 comprises such flexible material. It should also be noted that end portion 54 and end 56 are suitably attached to structure 36 and free end 46 with pivot joints 64 and 66 for ease of movement in relation thereto.

Still further, as shown in FIG. 7, cam surface 62 can have a grooved shape along the path of movement of element 52 for receiving that element, to prevent inadvertent disengagement of element 52 therewith, as could result, for instance, from shocks vibrations and the like from travel or rough surfaces, e.g., furrows, ruts, ditches and the like.

As still another alternative, conveyor 32 can comprise any of a variety of conveyor constructions, including, but not limited to, a helical auger conveyor, or the like, and can include suitable apparatus for drivingly connecting sections of an auger at elbow 48, such as a slip joint or sleeve, or the like (not shown). As another option, support structure 36 can include, for instance, a saddle type support bracket 70 configured and positioned for supporting free end 46 of conveyor 32 when in the stored position.

As an advantage of the invention, conveyor 32 can be configured in the stored position (FIG. 1) with free end 46 lowered and bent or folded downwardly alongside support structure 36 of cart 10, so as to be more compact and less likely to contact and damage, or be damaged by, objects above the cart such as trees, utility wires, and the like. As another advantage, when in the operating position (FIG. 3), free end 46 is raised to a sufficient height H for unloading into receivers such as wagons, trailers and the like, having a representative height HW. As still another advantage, because of the use of cam element 60 for raising and lowering conveyor 32, including unbending and bending elbow 48, no pressurized fluid is required for these functions, and thus no load is placed on a fluid system of an accompanying vehicle such as harvesting machine 16 for performing these functions. Also, as an advantage, as these functions occur as an automatic result of the movement of conveyor 32 between the stored and operating positions, no additional control circuit is required, and the unloading operation can be performed using only circuits for controlling an actuator or driver for pivoting the conveyor between the two positions, and for operating the conveyor. This is particularly advantageous for applications wherein the operation of the systems of cart 10 are to be controlled by a towing vehicle such as a harvesting machine 16, or a receiving vehicle, as it limits the fluid loads on the fluid system of the towing machine, and facilitates ease of control, e.g., one or two switches on the controlling machine.

As noted above, conveyor 32 is preferably a belt type conveyor, which here includes an endless belt 72 encircling rollers 74 and 76 on first end 34 and free end 46. Intermediate rollers or low friction surfaces for supporting belt 72 at intermediate locations along the length thereof can also be used (not shown). Roller 76 is preferably driven by a drive 78, which can be, for instance, a fluid motor, electric motor, or the like, in the well known manner. Due to the presence of elbow 48, the lower side of belt 72 below the rollers will be slack when conveyor 32 is bent, and will be tensioned by straightening conveyor 32. Variously, a pan 82 can be provided in association with the first end 34 of conveyor 32, for guiding cob flow onto that end of conveyor 32, as denoted by an arrow in FIG. 3, and a deflector or guide (not shown) can be provided on the opposite end of conveyor 32, for deflecting cob flow into a receiver, as desired or required for a particular application.

Conveyor 32 can be pivoted between the stored and operating positions manually, or using a suitable driver, such as a rotary or linear actuator or driver, such as a fluid cylinder, motor, or the like, generally denoted by fluid cylinder 80 in FIGS. 1, 2 and 5. Control of cylinder 80, as well as drive 78 of conveyor 32, can be located as desired or required, e.g., on a towing vehicle or a receiving vehicle, as desired or required for a particular application.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An unloader system for bulk materials, comprising: an elongate conveyor including a first end supported on a support structure for pivotal movement about a pivotal axis from a stored position, to an operating position, the conveyor extending longitudinally from the first end to a free end spaced from the support structure; an elbow that is positioned on the elongate conveyor between the first end and the free end, the elbow permits extension of the elongate conveyor all-through an upward motion thereof from the stored position to the operating position, the elbow further enables storage of the elongate conveyor along a longitudinal side of a vehicle associated with the elongate conveyor; and a raise system that generates the upward motion via a cam element and without hydraulic pressure, to mitigate placing a load on fluid systems of an agricultural equipment that hosts the unloader system;
   wherein the raise system includes a support element that comprises a cable;
   wherein the support element is configured to cause the elbow to straighten from a bent configuration to raise the free end of the elongate conveyor when pivoted to the operating position, and to cause the elbow to bend to lower the free end of the conveyor when pivoted to the stored position;

wherein the support structure comprises a cart;

wherein the cam element comprises a curved surface configured and positioned such that the flexible first end of the support element will conformingly engage therewith as the conveyor is pivoted toward the operating position.

2. The unloader system of claim 1, wherein the elongate conveyor comprises a belt conveyor.

3. An unloader system for a vehicle that carries bulk material, comprising: a cross conveyor; an elongate conveyor including a first end supported on a support structure on the vehicle for pivotal movement about a generally vertical pivotal axis laterally spaced from the first end, the pivotal movement between a stored position wherein the elongate conveyor is spaced from the cross conveyor, and an operating position wherein the elongate conveyor is adjacent to and in fluid communication with the cross conveyor, the conveyor extending longitudinally from the first end to a free end spaced from the support structure; a pivot that is substantially placed in middle of the elongate conveyor to allow extension of the elongate conveyor during a raising thereof; the pivot further provides for storage of the elongate conveyor along a length of the vehicle, and a raise system that raises the elongate conveyor via a cam element, and absent employing hydraulic pressure, to avoid placing a load on fluid systems of the vehicle;

wherein a cable associated with the raise system will be tensioned by an engagement with the cam element to straighten an elbow that includes the pivot from a bent configuration to raise the free end of the elongate conveyor when pivoted to the operating position, and to bend the elbow to lower the free end of the conveyor when pivoted to the stored position;

wherein the cam element comprises a curved surface about which the cable will matingly conform as the conveyor is pivoted toward the operating position;

wherein the vehicle comprises a cart.

4. The unloader system of claim 3, further comprising an actuator operatively connected to a bracket for a pivot thereof about the generally vertical pivotal axis.

5. An unloader system for bulk materials carried by a vehicle, comprising: a support structure on the vehicle, the support structure including a support bracket having a generally vertical pivot axis; an elongate conveyor including: a first end supported on the support structure and extending longitudinally from the first end to a free end spaced from the support structure, an elbow that is positioned intermediate the first end and the free end operable for allowing upward and downward pivotal movement of the free end relative to the first end, wherein the elbow facilitates extension of the elongate conveyor after beginning of an upward motion thereof from a stored position all-through to an operating position, the elbow further enables storage of the elongate conveyor along a longitudinal side of a vehicle associated with the elongate conveyor and a raise system that generates an upward motion via a cam element and without hydraulic pressure, to mitigate placing a load on fluid systems of an agricultural equipment that hosts the unloader system, the raise system including an elongate, flexible cable having a first end portion and an opposite second end, the first end portion being connected to the support structure at a location higher than the first end of the conveyor, and the second end being connected to the free end of the conveyor, the first end portion of the cable being positioned to move along a predetermined path as the conveyor is pivoted between the stored position and the operating position, and a the cam element disposed on the support structure along the path such that when the conveyor is pivoted from the stored position toward the operating position the first end portion of the cable will bend partially around the cam element to cause the cable to simultaneously raise the free end of the conveyor about the elbow;

wherein the vehicle comprises a cart;

further comprising a cross conveyor, and wherein in the stored position the elongate conveyor is spaced from the cross conveyor, and in the operating position the elongate conveyor is adjacent to and in fluid communication with the cross conveyor.

6. The unloader system of claim 5, wherein the cam element comprises a curved surface about which the cable will bend as the conveyor is pivoted toward the operating position.

7. The unloader system of claim 6, wherein the curved surface face is disposed beside the first end portion of the cable when the conveyor is in the stored position.

8. The unloader system of claim 6, wherein the curved surface is a parabolic curve.

9. The unloader system of claim 5, wherein the conveyor comprises a belt conveyor.

10. The unloader system of claim 5, wherein the cart is configured for carrying agricultural residue.

11. The unloader system of claim 5, wherein the vehicle comprises a second conveyor disposed for delivering a flow of bulk material to the first end of the conveyor when in the operating position.

* * * * *